United States Patent [19]

Campbell et al.

[11] Patent Number: 4,517,890
[45] Date of Patent: May 21, 1985

[54] TWINE WRAPPING APPARATUS FOR A ROLL BALING MACHINE

[75] Inventors: Willis R. Campbell, Ephrata; James D. Walker, Lancaster, both of Pa.

[73] Assignee: Sperry Corporation, New Holland, Pa.

[21] Appl. No.: 600,872

[22] Filed: Apr. 16, 1984

[51] Int. Cl.³ .............................................. B65B 13/18
[52] U.S. Cl. ........................................... 100/5; 100/88
[58] Field of Search .................. 100/5, 13, 88; 56/341

[56] References Cited

U.S. PATENT DOCUMENTS

| | | | |
|---|---|---|---|
| 2,627,223 | 2/1953 | Berge | 100/5 X |
| 3,988,977 | 11/1976 | Anderson | 100/5 |
| 4,133,258 | 1/1979 | Popiolek | 100/5 |
| 4,167,844 | 9/1979 | Freimuth | 100/5 X |
| 4,378,732 | 4/1983 | Simonis | 100/5 |
| 4,386,561 | 6/1983 | Viaud | 100/5 |

Primary Examiner—Billy J. Wilhite
Attorney, Agent, or Firm—Darrell F. Marquette; Frank A. Seemar; Larry W. Miller

[57] ABSTRACT

A twine wrapping apparatus for a roll baling machine includes a shuttle member which carries a gear rack that intermeshes with a pinion connected to a twine dispensing member such as a twine tube. When the shuttle member is moved generally transversely of the roll baling machine, the pinion is rotated by the gear rack resulting in pivoting movement of the twine tube.

16 Claims, 13 Drawing Figures

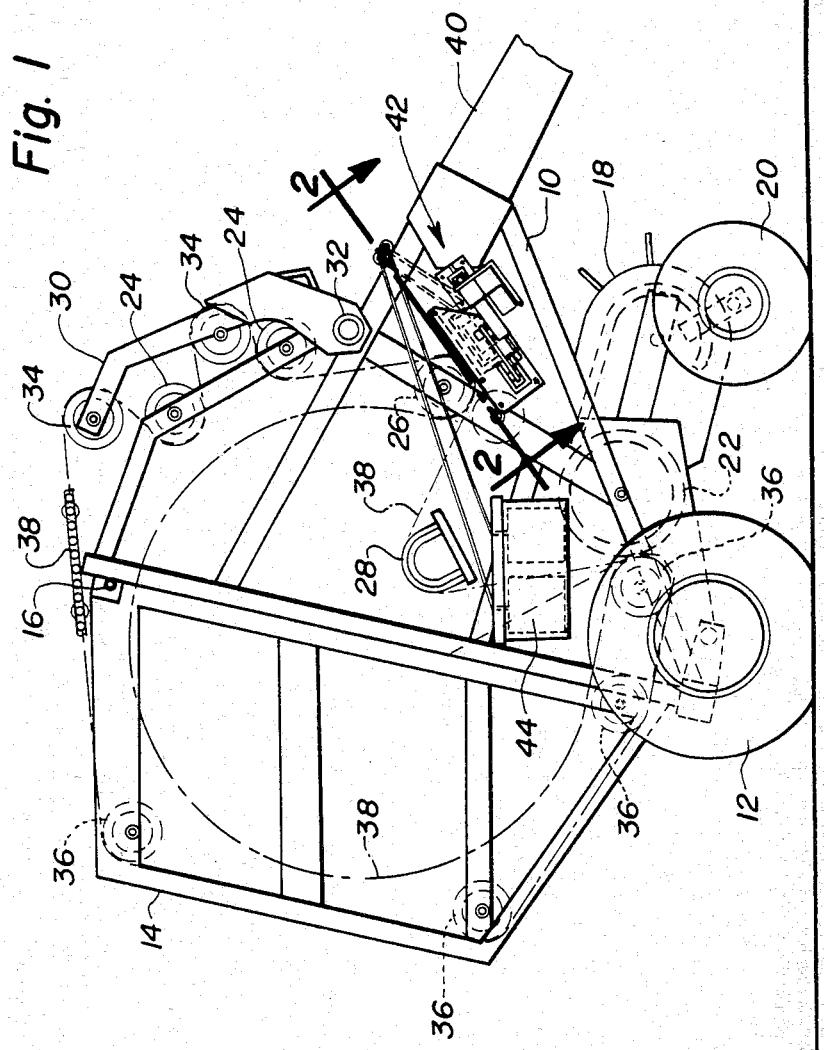

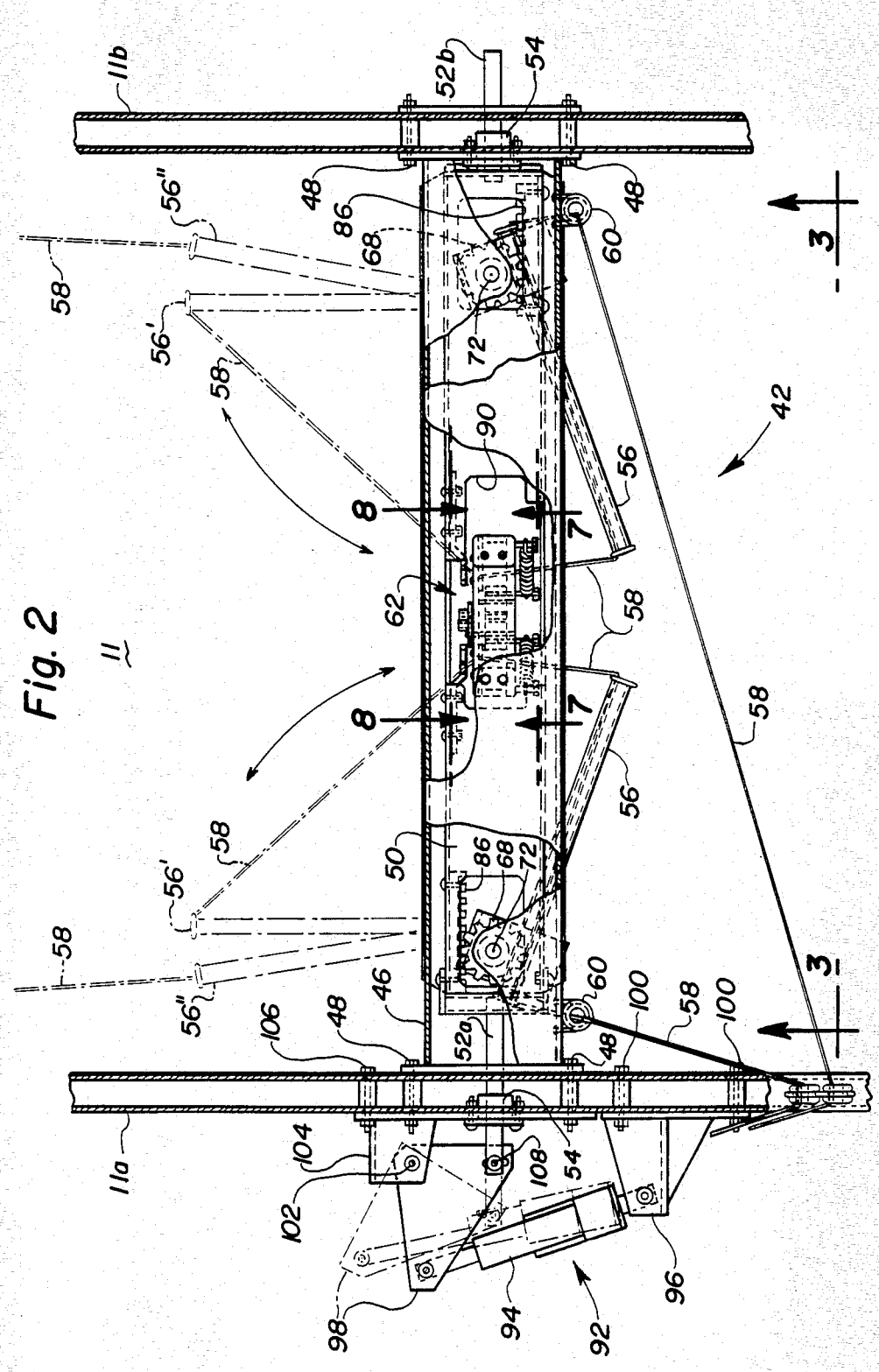

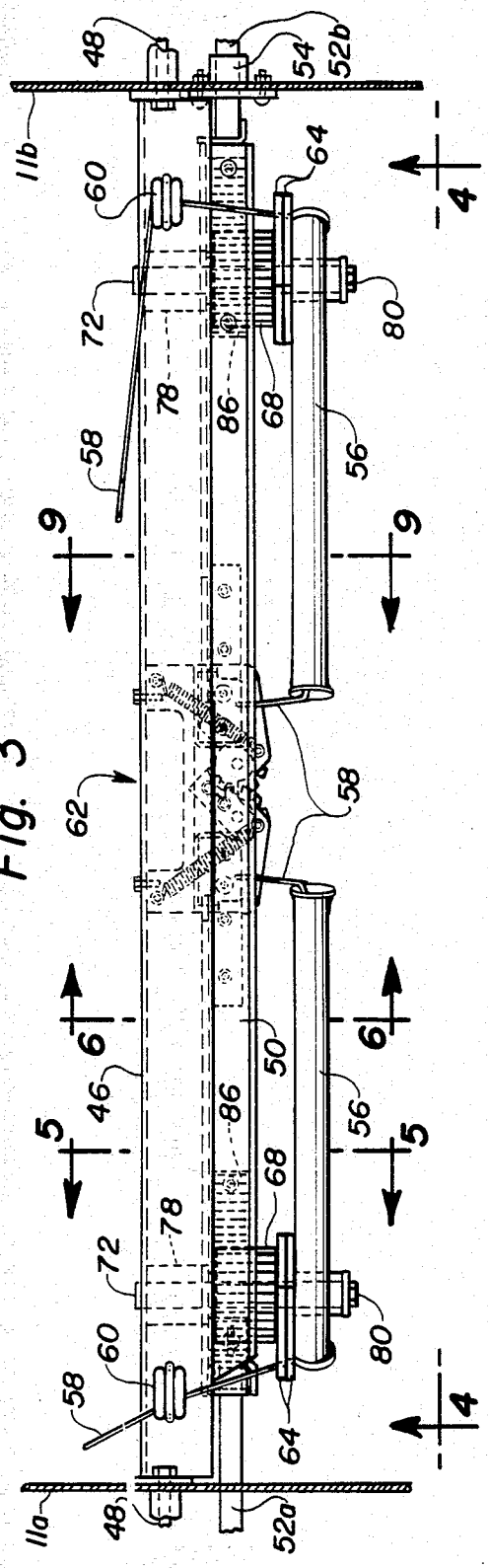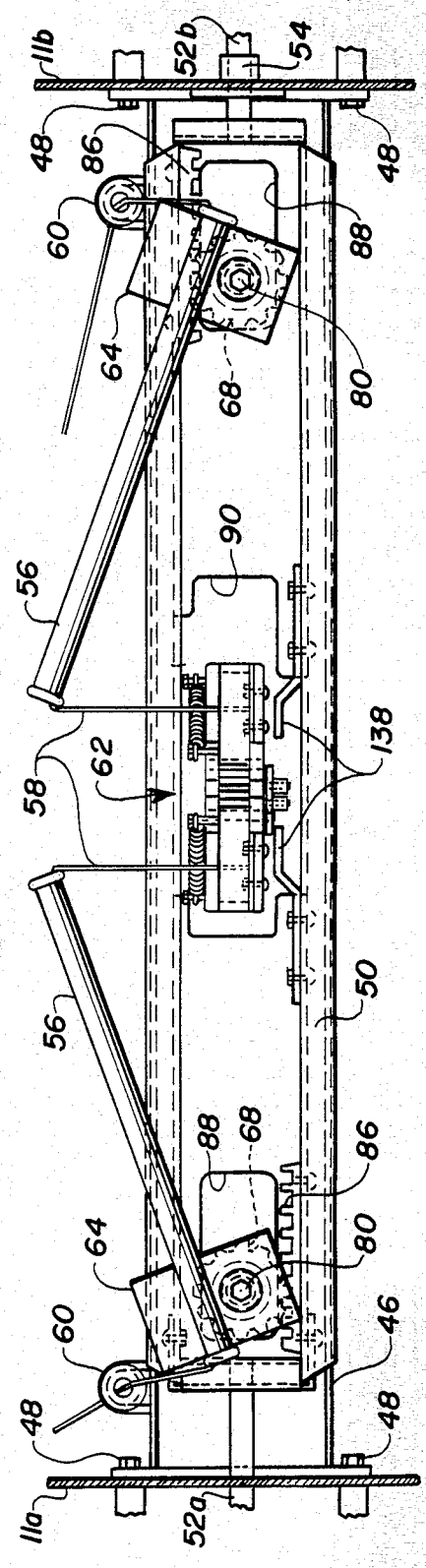

TWINE WRAPPING APPARATUS FOR A ROLL BALING MACHINE

BACKGROUND OF THE INVENTION

This invention relates generally to roll baling machines typically referred to as round balers which form cylindrical roll bales of crop material. In particular, this invention relates to a twine wrapping apparatus for such roll baling machines.

U.S. Pat. No. 4,167,844 discloses a twine wrapping apparatus including a drag link connected between a cam follower link and a driven link. The cam follower link carries a roller engaged with a cam plate, and the driven link is connected to a twine dispensing tube. When the cam plate is rotated, the roller on the cam follower link follows the peripheral contour of the cam plate so that the cam follower link moves the drag link in a manner which results in rotation of the driven link and pivoting movement of the twine dispensing tube. A significant disadvantage of this twine wrapping apparatus is that precise adjustments of the cam plate and the drag link are required in order for the apparatus to operate properly.

SUMMARY OF THE INVENTION

The present invention is directed to a novel twine wrapping apparatus for use in a roll baling machine having a base frame with a pair of side walls arranged to define a space therebetween. The novel twine wrapping apparatus includes a shuttle member movable generally transversely of the base frame in the space defined between the side walls, and a twine dispensing member pivotally mounted on the base frame. A gear rack is carried on the shuttle member in intermeshing engagement with a pinion which is connected to the twine dispensing member. The gear rack and the pinion cooperate to cause pivoting movement of the twine dispensing member when the shuttle member is moved generally transversely of the base frame in the space defined between the side walls.

DESCRIPTION OF THE DRAWINGS

FIG. 1 is a side elevation view of a roll baling machine incorporating the preferred embodiment of the twine wrapping apparatus of the present invention;

FIG. 2 is an enlarged sectional view taken on lines 2—2 of FIG. 1;

FIG. 3 is a view taken on lines 3—3 of FIG. 2;

FIG. 4 is a view taken on lines 4—4 of FIG. 3;

DESCRIPTION OF THE PREFERRED EMBODIMENT

Figure 5:
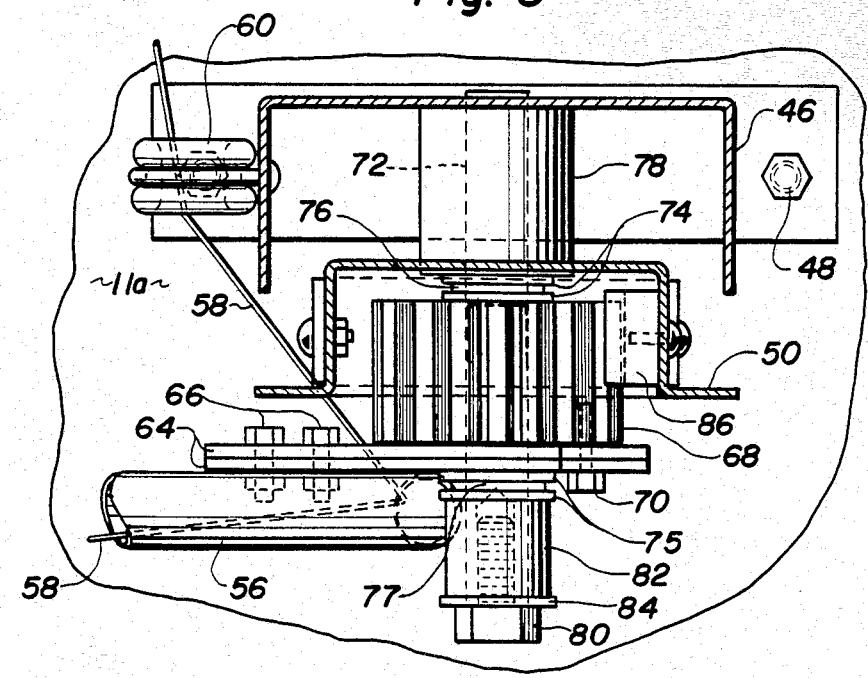
FIG. 5 is an enlarged sectional view taken on lines 5—5 of FIG. 3.

Referring to FIG. 1, a roll baling machine incorporating the preferred embodiment of the present invention includes a base frame 10 supported by a pair of wheels 12, and a rear frame 14 pivotally connected at 16 to the base frame 10 by suitable bearings. A pickup unit 18 is mounted on the base frame 10 and is supported by wheels 20. A floor roller 22, guide members 24, and drive sprockets 26 are rotatably mounted on the base frame 10. Also, cam guide members 28 are supported on the base frame 10. An arm assembly 30 is rotatably mounted on the base frame 10 by a tube 32, and the arm assembly 30 carries guide members 34 which are rotatable. A plurality of guide members 36 are rotatably supported on the rear frame 14. A bale forming apron 38 is movably supported on the drive sprockets 26, the guide members 24, 34 and 36, and the cam guide members 28. The bale forming apron 38 is preferably comprised of a pair of endless link type chains connected at spaced intervals by transverse bars or slats. When the machine is empty, the apron 38 is supported on the cam guide members 28 to define a bale chamber having an initial wedge shape in side elevation. During bale formation, the apron 38 is lifted off the cam guide members 28 as the bale chamber expands to a generally cylindrical shape.

According to the present invention, a twine wrapping apparatus 42 is supported on the base frame 10 and a twine box 44 is provided for supplying twine to the twine wrapping apparatus 42. As seen in FIGS. 2, 3, and 4, the twine wrapping apparatus 42 includes a support beam 46 which extends transversely between the side walls 11a, 11b of the base frame 10 and is connected thereto by bolts 48. As seen in FIG. 5, the beam 46 is of a generally inverted U-shaped cross section. The twine wrapping apparatus 42 also includes a shuttle member 50 which is supported at its ends by rods 52a, 52b slidably disposed in bearings 54 mounted in the side walls 11a, 11b for permitting movement of the shuttle member 50 generally transversely of the base frame 10 in the space 11 defined between the side walls 11a, 11b. As seen in FIG. 5, the shuttle member 50 is generally channel or top hat-shaped in cross section. Twine dispensing members such as twine tubes or arms 56 are rotatably supported on the support beam 46, and strands of twine 58 extend from the twine box 44 through twine guides 60 mounted on the support beam 46, then through the twine tubes 56 and into a cut and clamp mechanism 62 which is also supported on the support beam 46.

The twine tubes 56 are each welded to the lower one of a pair of plates 64 as seen in FIG. 5, and the plates 64 are connected to each other by bolts 66. The plates 64 are fixed to pinions 68 by bolts 70, only one bolt 70 being shown in FIG. 5. The pinions 68 are rotatably mounted on shafts 72 which are fixed at their upper ends to the support beam 46. A pair of washers 74 and a bearing member 76 are disposed between the upper side of each pinion 68 and a stabilizer block 78 which is positioned between the uppermost washer 74 and the support beam 46. Another pair of washers 75 and another bearing member 77 are disposed underneath the lowermost plate 64, and a bolt 80 is threaded into the bottom end of each shaft 72. A spacer collar 82 and a washer 84 are disposed between the lowermost washer 75 and the head of each bolt 80. When the bolts 80 are tightened into the shafts 72, the twine tubes 56 are, in effect, fixed to and will rotate with the pinions 68 as will be described later. The shuttle member 50 carries gear racks 86 which have teeth in intermeshing engagement with the teeth of the pinions 68. As seen in FIG. 4, openings 88 are provided in the top of the shuttle member 50 near the ends thereof to accommodate the stabilizer blocks 78, and another opening 90 is provided in the top of the shuttle member 50 near the center thereof to accommodate the cut and clamp mechanism 62.

Referring now to FIG. 2, the mechanism 92 for actuating the twine wrapping apparatus 42 includes a linear actuator 94 which is pivotably connected at one end to a bracket 96 and at the other end to a lever arm 98. The bracket 96 is secured to side wall 11a of the base frame 10 by bolts 100. The lever arm 98 is pivotably connected by a pin 102 to a bracket 104 which is fixed to the side wall 11a of the base frame 10 by two of the bolts 48 and by a further bolt 106. The lever arm 98 is also pivotably connected by a pin 108 to the end of the rod 52a which extends through the side wall 11a of the base frame 10. When the linear actuator 94 is extended as shown in FIG. 2, the lever arm 98 is pivoted on pin 102 from the position shown in full lines to the phantom position thereby moving the shuttle member 50 generally transversely toward the side wall 11a of the base frame 10. This causes the gear racks 86 on the shuttle member 50 to move in a direction which will cause concurrent rotation of the pinions 68 on the shafts 72 in opposite directions with respect to each other. Such rotation of the pinions 68 will cause simultaneous pivoting movement of the twine tubes 56 in opposite directions with respect to each other from their home or rest positions shown in full lines to their dispensing positions shown in phantom at 56″. Subsequent contraction of the linear actuator 94 will move the shuttle member 50 back toward the side wall 11b of the base frame 10 and thereby cause simultaneous pivoting movement of the twine tubes 56 back to their home or rest positions shown in full lines.

Figure 6:
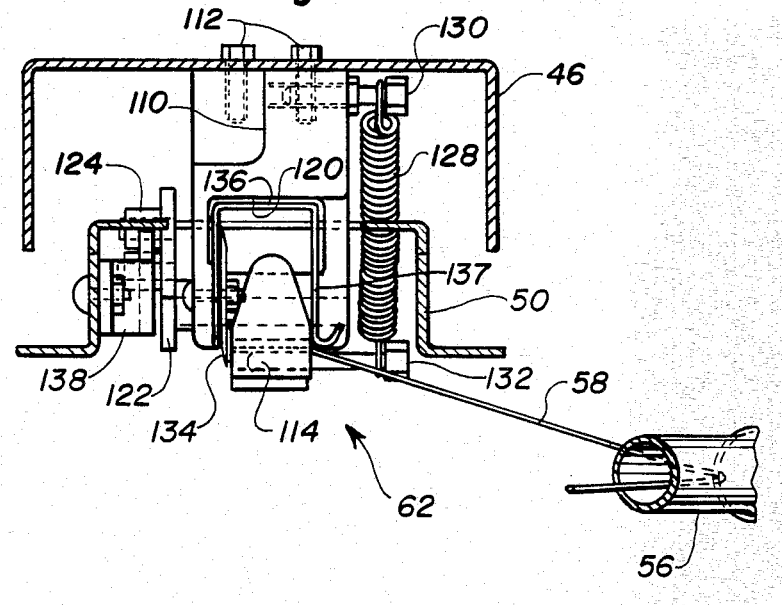
FIG. 6 is an enlarged sectional view taken on lines 6—6 of FIG. 3.
Figure 7:
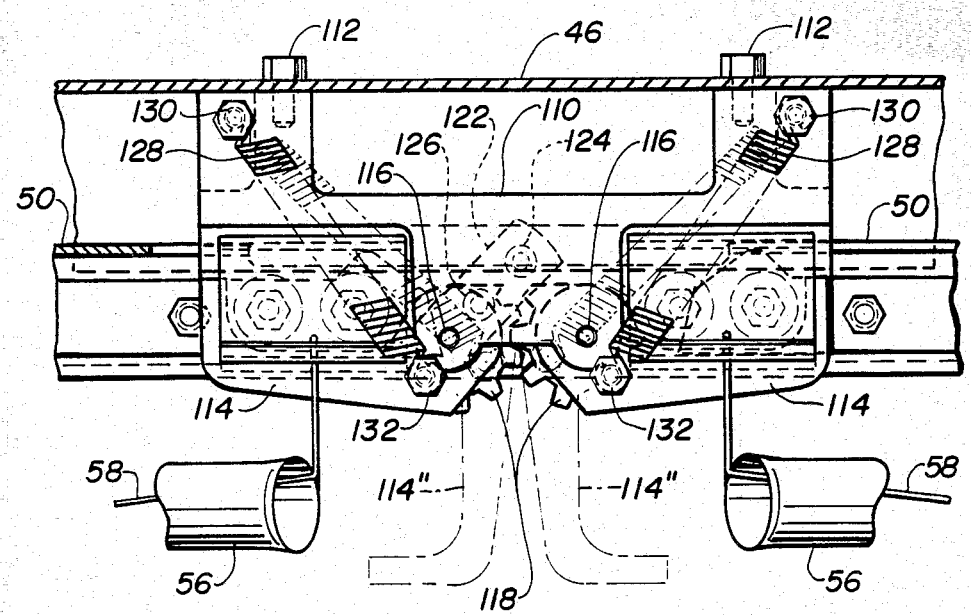
FIG. 7 is an enlarged sectional view taken on lines 7—7 of FIG. 2.
Figure 8:
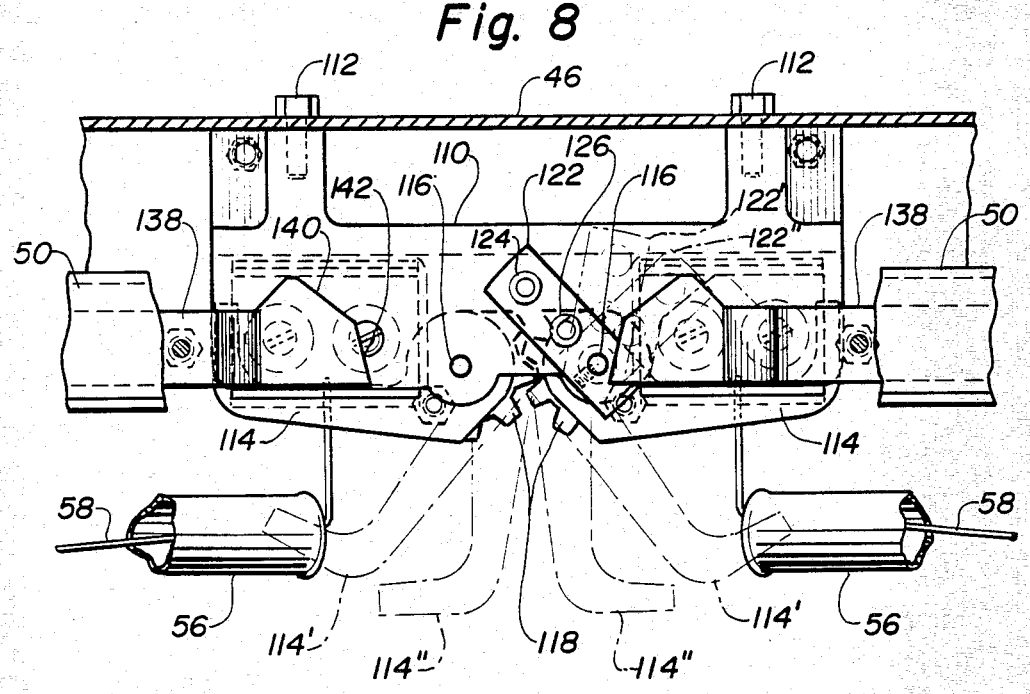
FIG. 8 is an enlarged sectional view taken on lines 8—8 of FIG. 2.

As seen in FIGS. 6, 7, and 8, the cut and clamp mechanism 62 includes a body member 110 which is fastened to the support beam 46 by four bolts 112. A pair of arms 114 are mounted on pins 116 which are pivoted on the body member 110. Intermeshing spur gears 118 are fixed to the arms 114. Pockets 120 are provided in the bottom of the body member 110 to accommodate portions of the arms 114 when they are pivoted to the closed positions shown in full lines in FIGS. 7 and 8. A lever 122 is fixed to one of the pins 116, and carries rollers 124 and 126. Tension springs 128 are connected between bolts 130 which are fastened to the body member 110 and bolts 132 which are connected to the arms 114. As best seen in FIG. 6, cutting members such as knives 134 and generally U-shaped spring clips 136 having resilient legs 137 are fastened to the body member 110 and are disposed in the pockets 120. A pair of cam members 138 are secured to the shuttle member 50. Each of the cam members 138 has a first cam surface 140 and a second cam surface 142 arranged for engaging the rollers 124 and 126, respectively, on the lever 122.

When the shuttle member 50 is moved toward the right in FIG. 8, the cam surface 140 on the left-hand cam member 138 engages the roller 124 on the lever 122 and pivots the lever 122 to the position shown in phantom at 122′. Further movement of the shuttle member 50 toward the right in FIG. 8 causes the cam surface 142 on the left-hand cam member 138 to engage the roller 126 on the lever 122 thereby pivoting the lever 122 to the position indicated in phantom at 122″. This pivoting movement of the lever 122 causes the intermeshing spur gears 118 to be rotated, resulting in concurrent pivoting movement of the arms 114 to their partially open positions shown in phantom at 114′ and finally to their fully open positions indicated in phantom at 114″. As the arms 114 are pivoted to their fully open positions 114″, the springs 128 seen in FIG. 7 will move slightly over center with respect to the pins 116 and will hold the arms 114 in that position. Subsequent opposite movement of the shuttle member 50 toward the left in FIG. 8 will result in the right-hand cam member 138 pivoting the arms 114 back toward their closed positions shown in full lines. As the arms 114 reach their partially open positions 114′, the springs 128 will move sufficiently back over center with respect to the pins 116 to quickly snap the arms 114 back into their closed positions.

Figure 9:
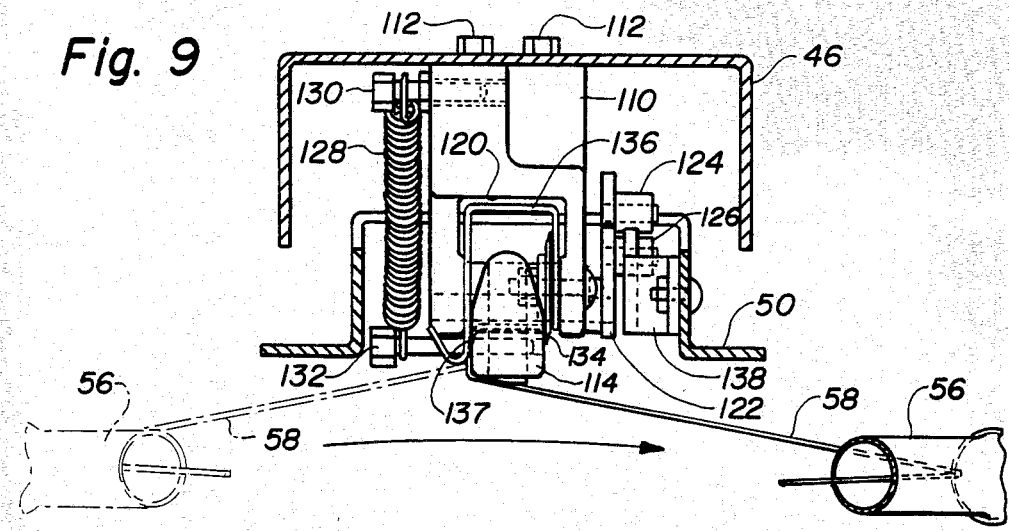
FIG. 9 is an enlarged sectional view taken on lines 9—9 of FIG. 3.
Figure 10:
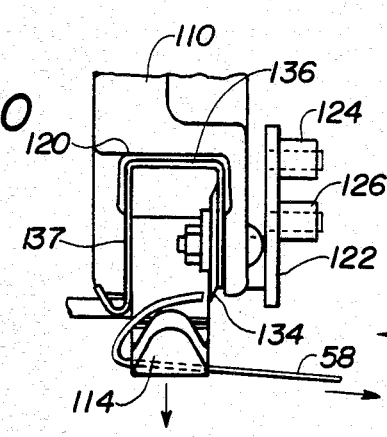
FIGS. 10–13 are schematic views of the mechanism shown in FIGS. 6–9.
Figure 11:
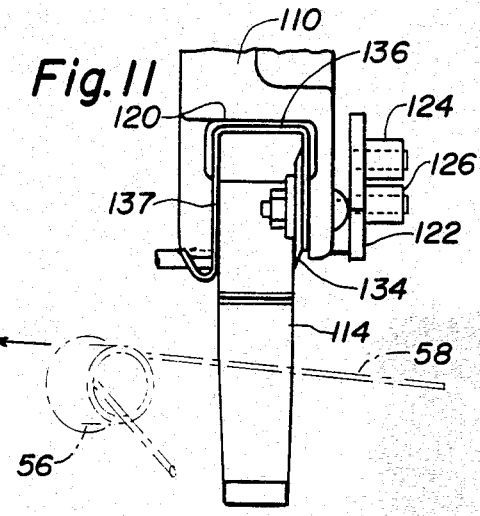
Figure 12:
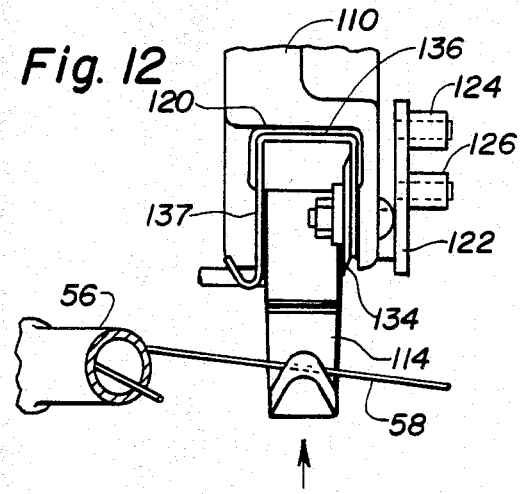
Figure 13:
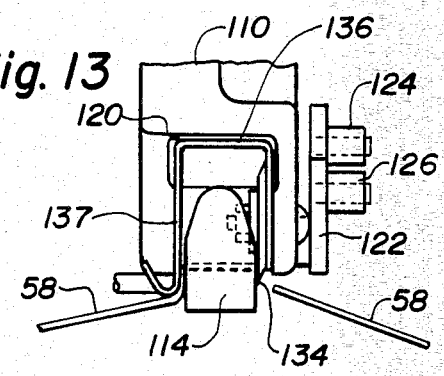

The twine cutting and clamping operation of the cut and clamp mechanism 62 will be best understood by referring to FIGS. 9–13. As seen in FIG. 9, the strands of twine 58 are each initially clamped between an edge of one of the arms 114 and the resilient leg 137 of one of the spring clips 136 when the arms 114 are in their closed positions. As the arms 114 move toward their partially open positions, as shown in FIG. 10, the strands of twine 58 are released. The strands of twine 58 remain released as the arms 114 move to their fully open position shown in FIG. 11 and also as the arms 114 move back toward their closed position as shown in FIG. 12. As the arms 114 are snapped back into their closed position by the springs 128 as shown in FIG. 13, each strand of twine 58 is cut by a rapid shearing or scissors type action between an edge of one of the arms 114 and the cutting edge of one of the knives 134 while being simultaneously clamped between the other edge of the arm 114 and the resilient leg 137 of the spring clip 136.

During the formation of a roll bale in the machine of FIG. 1, the twine tubes 56 are disposed in their home or rest positions shown in full lines in FIG. 2 and the arms 114 are in their closed positions so that the strands of twine 58 are clamped in the cut and clamp mechanism 62. When the roll bale has been completed and it is desired to wrap the bale with twine, the linear actuator 94 is extended thereby moving the shuttle member 50 toward the sidewall 11a of the base frame 10. This movement of the shuttle member 50 causes the twine tubes 56 to be pivoted, due to the gear racks 86 and the pinions 68, toward the positions indicated in phantom at 56′ in FIG. 2 while the strands of twine 58 remain clamped in the cut and clamp mechanism 62. By clamping the strands of twine 58 in the cut and clamp mechanism 62 while the twine tubes 56 are moved from their home positions to their phantom positions 56′, relatively long twine tails are generated on the strands of twine 58. Further movement of the shuttle member 50 toward the sidewall 11a of the base frame 10 causes the twine tubes 56 to be pivoted to their dispensing positions shown in phantom at 56″ in FIG. 2. As the twine tubes 56 move from the phantom positions 56′ to their dispensing positions 56″, the arms 114 are moved from their closed positions to their fully open positions 114″ and the strands of twine 58 are released from the cut and clamp mechanism 62. The twine tails are fed into the bale chamber in order to be caught between the floor roller 22 and the rotating bale. The linear actuator 94 is then contracted to move the shuttle member 50 back toward the sidewall 11b of the base frame 10 and thereby pivot the twine tubes 56 from their dispensing positions 56″ back toward their home positions shown in full lines in FIG. 2. During this pivoting movement of the twine tubes 56, twine is wrapped around the bale in a spiral manner. As the twine tubes 56 reach their home positions, the arms 114 are snapped back to their closed positions by the springs 128 and the strands of twine 58 are simultaneously cut and clamped in the cut and clamp mechanism 62. The wrapped bale is then discharged from the machine by pivoting the rear frame 14 upwardly in a known manner. The twine wrapping apparatus 42 is ready to wrap the next bale with twine.

It will be understood that the linear actuator 94 may be in the form of an electric servomotor or a hydraulic piston and cylinder unit. Furthermore, the linear actuator 94 may take the form of a manual device such as a threaded rod.

It will also be understood that the present invention is not limited to the arrangement as disclosed in the preferred embodiment of the twine wrapping apparatus where two twine tubes 56 are employed. Alternatively, the twine wrapping apparatus of the present invention may employ only one twine tube or any other number of twine tubes.

The following claims are intended to cover all modifications and variations of the preferred embodiments of the invention without departing from the spirit and scope of the invention.

Having thus described the invention, what is claimed is:

1. In a roll baling machine having a base frame with a pair of side walls arranged to define a space therebetween, an apparatus for wrapping a roll bale with twine, said apparatus comprising:
   a shuttle member movable generally transversely of said base frame in the space defined between said side walls;
   a twine dispensing member pivotably mounted on said base frame; and
   a gear rack carried on said shuttle member in intermeshing engagement with a pinion connected to said twine dispensing member, said gear rack and said pinion cooperating to cause pivoting movement of said twine dispensing member when said shuttle member is moved generally transversely of said base frame in the space defined between said side walls.

2. The apparatus of claim 1, wherein said twine dispensing member is pivotably movable between a rest position and a dispensing position.

3. The apparatus of claim 2, wherein said twine dispensing member is pivoted from said rest position to said dispensing position when said shuttle member is moved toward one of said side walls, and said twine dispensing member is pivoted from said dispensing position to said rest position when said shuttle member is moved toward the other one of said side walls.

4. The apparatus of claim 3, further comprising actuating means including a linear actuator for moving said shuttle member transversely of said base frame in the space defined between said side walls, said linear actuator being selectively extendable and contractable.

5. The apparatus of claim 4, wherein said shuttle member is moved toward said one side wall when said linear actuator is extended, and wherein said shuttle member is moved toward said other one side wall when said linear actuator is contracted.

6. The apparatus of claim 5, wherein said actuating means also includes a lever arm connected between said linear actuator and said shuttle member.

7. The apparatus of claim 6, wherein said linear actuator and said lever arm are located outside the space defined between said side walls.

8. In a roll baling machine having a base frame with a pair of side walls arranged to define a space therebetween, an apparatus for wrapping a roll bale with twine, said apparatus comprising:
   a pinion rotatably mounted on said base frame;
   a twine dispensing member connected to said pinion;
   a shuttle member movable generally transversely of said base frame in the space defined between said side walls; and
   a gear rack carried on said shuttle member in intermeshing engagement with said pinion.

9. The apparatus of claim 8, further comprising a support beam extending between and connected to said side walls, a shaft fixed to said support beam, and said pinion rotatably mounted on said shaft.

10. The apparatus of claim 9, wherein said twine dispensing member is fixed to a plate which is connected to said pinion.

11. The apparatus of claim 8, wherein said shuttle member is supported at its ends by rods which are slidably disposed in said side walls.

12. The apparatus of claim 11, further comprising actuating means connected to at least one of said rods to move said shuttle member generally transversely of said base frame in the space defined between said side walls.

13. The apparatus of claim 12, wherein said actuating means comprises a linear actuator connected to a lever arm which is connected to said at least one rod.

14. The apparatus of claim 13, wherein said linear actuator and said lever arm are located outside the space defined between said side walls.

15. In a roll baling machine having a base frame with a pair of side walls arranged to define a space therebetween, an apparatus for wrapping a roll bale with twine, said apparatus comprising:
   first and second pinions rotatably mounted on said base frame;
   first and second twine dispensing members connected to said first and second pinions, respectively;
   a shuttle member movable generally transversely of said base frame in the space defined between said side walls; and
   first and second gear racks carried on said shuttle member in intermeshing engagement with said first and second pinions, respectively.

16. The apparatus of claim 15, wherein said first and second gear racks cooperate with said first and second pinions, respectively, to cause pivoting movement of said first and second twine dispensing members in opposite directions with respect to each other when said shuttle member is moved generally transversely of said base frame in the space defined between said side walls.

* * * * *